United States Patent
Ide et al.

(10) Patent No.: US 8,143,839 B2
(45) Date of Patent: Mar. 27, 2012

(54) ALTERNATING-CURRENT MOTOR CONTROL APPARATUS

(75) Inventors: Kozo Ide, Kitakyushu (JP); Sadayuki Sato, Kitakyushu (JP); Hideaki Iura, Kitakyushu (JP); Shinya Morimoto, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 316 days.

(21) Appl. No.: 12/555,808

(22) Filed: Sep. 9, 2009

(65) Prior Publication Data

US 2010/0079103 A1   Apr. 1, 2010

(30) Foreign Application Priority Data

Sep. 26, 2008   (JP) ................. 2008-247028

(51) Int. Cl.
H02P 27/04  (2006.01)
H02P 27/00  (2006.01)
H02P 6/00  (2006.01)
H02P 21/00  (2006.01)

(52) U.S. Cl. ............. 318/811; 318/400.01; 318/400.02; 318/400.32; 318/700; 318/727; 318/799; 318/802; 318/807

(58) Field of Classification Search ............. 318/400.01, 318/400.02, 400.32, 700, 727, 799, 802, 318/807, 811
See application file for complete search history.

(56) References Cited

U.S. PATENT DOCUMENTS

| 5,332,061 | A | * | 7/1994 | Majeed et al. | 180/312 |
|---|---|---|---|---|---|
| 6,518,722 | B1 | * | 2/2003 | Giuseppe | 318/727 |
| 6,777,906 | B1 | * | 8/2004 | Kinpara et al. | 318/727 |
| 6,788,024 | B2 | * | 9/2004 | Kaneko et al. | 318/807 |
| 7,045,988 | B2 | * | 5/2006 | Ha et al. | 318/807 |
| 7,411,370 | B2 | * | 8/2008 | Kono | 318/802 |
| 7,463,005 | B2 | * | 12/2008 | Iura et al. | 318/727 |
| 2002/0113569 | A1 | * | 8/2002 | Iijima et al. | 318/727 |
| 2003/0030404 | A1 | * | 2/2003 | Iwaji et al. | 318/700 |
| 2003/0102839 | A1 | | 6/2003 | Kinpara et al. | |
| 2005/0146306 | A1 | * | 7/2005 | Ha et al. | 318/807 |
| 2009/0160394 | A1 | * | 6/2009 | Zhang et al. | 318/799 |

FOREIGN PATENT DOCUMENTS

| JP | 2003-319697 | 11/2003 |
|---|---|---|
| WO | WO 02/091558 | 11/2002 |

* cited by examiner

Primary Examiner — Walter Benson
Assistant Examiner — Gabriel Agared
(74) Attorney, Agent, or Firm — Ditthavong Mori & Steiner, P.C.

(57) ABSTRACT

An alternating-current motor control apparatus includes a stator frequency computing unit configured to compute a stator frequency of a motor magnetic flux; a torque error computing unit configured to compute a torque error by using the motor magnetic flux, an estimated current, and a motor current; and a speed estimator configured to estimate a speed of the alternating-current motor by using the stator frequency and the torque error. The speed estimator includes a proportional controller configured to reduce the torque error to zero, and an adaptive filter configured to eliminate a high-frequency component of the torque error.

14 Claims, 7 Drawing Sheets

RELATED ART

EMBODIMENT OF PRESENT INVENTION

ALTERNATING-CURRENT MOTOR CONTROL APPARATUS

CROSS REFERENCES TO RELATED APPLICATIONS

The present application is related to Japanese Patent application no. 2008-247028 filed at Japan Patent Office titled "AC Motor Controller and Its Control Method", all of which are incorporated herein by reference.

BACKGROUND OF THE INVENTION

1. Field of the Invention

The present invention relates to an alternating-current (AC) motor control apparatus and an AC motor control method for performing torque control or speed control of an AC motor without using a position or speed sensor.

2. Description of Related Art

Methods for estimating the position and speed of an AC motor without using a position or speed sensor are roughly classified into methods in which the position and speed of an AC motor are estimated in accordance with a detected or estimated value of a motor induced voltage and methods in which the position and speed of an AC motor are estimated, by applying a high-frequency signal to the AC motor, in accordance with a detected value of a voltage or a current that depends on the inductance characteristic of the AC motor. The former method is suitable for driving an AC motor for which the inductance characteristic of the AC motor is not available in advance. However, in the former method, in a case where the frequency at which the AC motor is driven is low, since the induced voltage is low, the signal-to-noise (S/N) ratio is reduced due to the influences of measured noise and the nonlinearity of characteristics of a driving circuit. Hence, a speed estimation error is increased.

For example, WO2002/091558 suggests a technique in which the speed of a motor is estimated, not directly in accordance with an induced voltage, but by estimating magnetic flux in accordance with a motor model, and at the same time, by estimating an error signal in accordance with an estimated value of magnetic flux and a deviation between a redundant estimated value of a current and a detected value of a current, using a proportional-plus-integral compensator that reduces the error signal to zero.

In addition, Japanese Unexamined Patent Application Publication No. 2003-319697 suggests a technique in which a gain computing unit is improved in such a manner that a gain of a deviation amplifier used for correcting the input of a motor model is properly output and the accuracy and responsiveness of speed estimation are thus improved while the reliability and responsiveness of speed estimation are taken into consideration.

SUMMARY OF THE INVENTION

According to an aspect of the present invention, there is provided a control apparatus including a pulse width modulation controller for driving an alternating-current motor by outputting a command voltage. The control apparatus includes a motor model computing unit configured to compute a motor magnetic flux and an estimated current of the alternating-current motor by using the command voltage; a current detector configured to detect a motor current flowing in the alternating-current motor; a stator frequency computing unit configured to compute a stator frequency of the motor magnetic flux; a torque error computing unit configured to compute a torque error by using the motor magnetic flux, the estimated current, and the motor current; and a speed estimator configured to estimate a speed of the alternating-current motor by using the stator frequency and the torque error.

According to another aspect of the present invention, there is provided a control method performed in a control apparatus including a pulse width modulation controller for driving an alternating-current motor by outputting a command voltage. The control method includes a step of detecting a motor current flowing in the alternating-current motor; a step of computing a motor magnetic flux and an estimated current of the alternating-current motor by using the command voltage; a step of computing a stator frequency of the motor magnetic flux; a step of computing a torque error by using the motor magnetic flux, the estimated current, and the motor current and estimating a speed of the alternating-motor current in accordance with an output value that has been subjected to proportional control in such a manner that the torque error is reduced to zero; and a step of correcting the estimated speed in accordance with a value obtained by eliminating a high-frequency component of the torque error by using the stator frequency.

BRIEF DESCRIPTION OF THE DRAWINGS

Exemplary embodiments of the present invention will be described in detail based on the following figures, wherein.

DESCRIPTION OF THE PREFERRED EMBODIMENTS

Hereinafter, embodiments of the present invention will be described with reference to the drawings.

Figure 1:
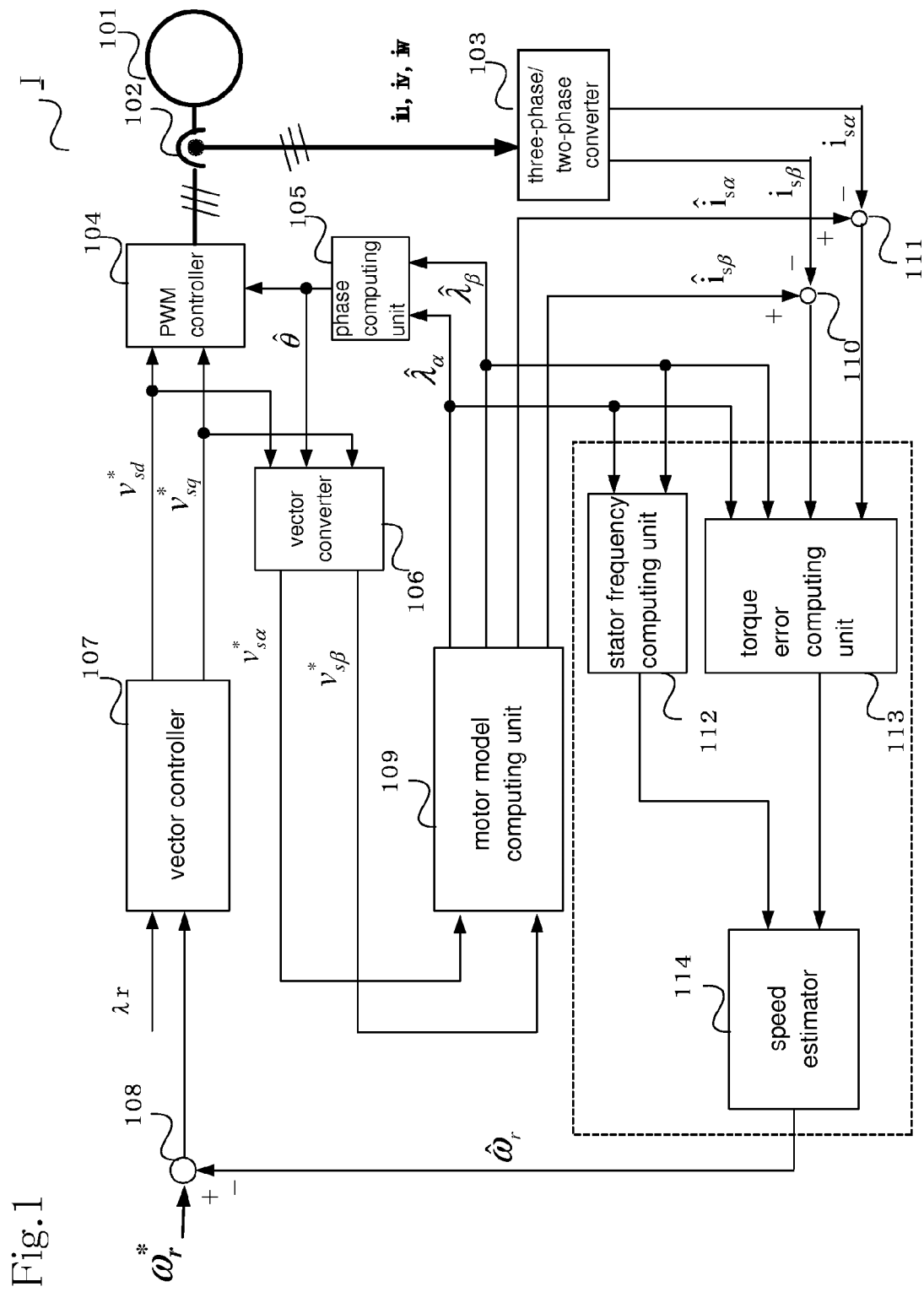
FIG. 1 is a block diagram of an AC motor control apparatus according to a first embodiment.

FIG. 1 is a block diagram of an AC motor control apparatus 1 according to a first embodiment of the present invention.

The control apparatus 1 includes a current detector 102 for detecting three-phase currents (iu, iv, and iw) of a motor 101, and a three-phase/two-phase converter 103 for converting the three-phase currents (iu, iv, and iw) into detected two-phase currents ($i_{s\alpha}$ and $i_{s\beta}$) in the rest system of coordinates.

The control apparatus 1 further includes a pulse width modulation (PWM) controller 104 for converting two-phase voltage commands ($V^*_{sd}$ and $V^*_{sq}$) output from a vector controller 107 into three-phase voltage commands (V*u, V*v, and V*w) in the fixed system of coordinates by using a magnetic flux azimuth $\hat{\theta}$ and applying the obtained three-phase voltage commands (V*u, V*v, and V*w) to the motor 101.

The control apparatus 1 further includes a phase computing unit 105 for computing the magnetic flux azimuth $\hat{\theta}$ in accordance with an arctangent operation using estimated magnetic flux values ($\hat{\lambda}_\alpha$ and $\hat{\lambda}_\beta$) output from a motor model computing unit 109 and outputting the magnetic flux azimuth $\hat{\theta}$ to the PWM controller 104 and a vector converter 106.

The control apparatus I further includes the vector converter 106 for performing coordinate conversion of the voltage commands ($V^*_{sd}$ and $V^*_{sq}$) output from the vector controller 107 into two-phase voltage commands ($V^*_{s\alpha}$ and $V^*_{s\beta}$) in the rest system of coordinates and outputting the two-phase voltage commands ($V^*_{s\alpha}$ and $V^*_{s\beta}$) to the motor model computing unit 109.

The control apparatus I further includes the vector controller 107 for performing vector control of the motor 101 in the method described later; and a subtracter 108 for computing a difference (speed deviation $\Delta\omega r$) between a given speed command value $\omega r^*$ and an estimated speed value $\hat{\omega}r$ output from a speed estimator 114 and outputting the speed deviation $\Delta\omega r$ to the vector controller 107.

The control apparatus I further includes the motor model computing unit 109 for computing estimated magnetic flux values ($\hat{\lambda}_\alpha$ and $\hat{\lambda}_\beta$) and estimated two-phase currents ($\hat{i}_{s\alpha}$ and $\hat{i}_{s\beta}$) in accordance with the computation described later; and subtracters 110 and 111 for computing deviations ($\Delta i_{s\alpha}$ and $\Delta i_{s\beta}$) between the estimated two-phase currents ($\hat{i}_{s\alpha}$ and $\hat{i}_{s\beta}$) and the detected two-phase currents ($i_{s\alpha}$ and $i_{s\beta}$) and outputting the deviations ($\Delta i_{s\alpha}$ and $\Delta i_{s\beta}$) to a torque error computing unit 113.

The control apparatus I further includes a stator frequency computing unit 112, the torque error computing unit 113, and the speed estimator 114 for computing an estimated speed value $\hat{\omega}r$ in the method described later, and drives the motor 101.

The vector controller 107 receives the speed deviation $\Delta\omega r$, a given magnetic flux command $\lambda r$, and a magnetic flux component id and a torque component iq (not illustrated) of a motor current. The vector controller 107 performs speed control and current control in such a manner that the speed deviation $\Delta\omega r$ is reduced to zero, and outputs the two-phase voltage commands ($V^*_{sd}$ and $V^*_{sq}$) to the PWM controller 104 and the vector converter 106. Since methods for computing and controlling the magnetic flux component id and the toque component iq of a motor current and these commands are known, the explanation and illustration of these methods will be omitted.

The motor model computing unit 109 receives the two-phase voltage commands ($V^*_{s\alpha}$ and $V^*_{s\beta}$) in the rest system of coordinates, and estimates magnetic flux values and currents in accordance with a mathematical model based on equations (1) and (2) as a motor model. The motor model computing unit 109 outputs the estimated magnetic flux values ($\hat{\lambda}_\alpha$ and $\hat{\lambda}_\beta$) to the phase computing unit 105, the stator frequency computing unit 112, and the torque error computing unit 113, and outputs the estimated currents ($\hat{i}_{s\alpha}$ and $\hat{i}_{s\beta}$) to the subtracters 110 and 111 so that deviations ($\Delta i_{s\alpha}$ and $\Delta i_{s\beta}$) can be calculated. In the following equations (1) and (2), vector notation is used, and voltage vector information represented as "V" in other parts of the description is represented as "u":

$$\frac{d}{dt}\hat{i}_s = a_{r11}\hat{i}_s + (a_{r12} - j\rho\hat{\omega}_r)\hat{\lambda} + b_s u_s \quad (1)$$

$$\frac{d}{dt}\hat{\lambda} = a_{r21}\hat{i}_s + (a_{r22} + j\hat{\omega}_r)\hat{\lambda}, \quad (2)$$

where state variables are represented as a stator current vector: $\hat{i}_s = \hat{i}_{s\alpha} + j\cdot\hat{i}_{s\beta}$, a stator voltage vector: $u_s = u_{s\alpha} + ju_{s\beta}$, and a magnetic flux vector: $\hat{\lambda} = \hat{\lambda}_\alpha + j\cdot\hat{\lambda}_\beta$ in the rest system of coordinates.

In addition, in the case of an induction motor, parameter definitions are as described below:

$$a_{r11} = -\frac{1}{\sigma L_s}(R_s + R'_r), \; a_{r12} = \frac{R'_r}{\sigma L_s M}, \; \rho = \frac{M}{\sigma L_s L_r}$$

$$a_{r21} = \frac{M}{T_r}, \; a_{r22} = -\frac{1}{T_r}, \; b_s = \frac{1}{\sigma L_s},$$

where Rs represents a primary resistance, $$R'_r = \left(\frac{M}{L_r}\right)^2 R_r$$

represents a secondary resistance obtained by conversion on the primary side, $$M' = \frac{M^2}{L_r}$$

represents a mutual inductance obtained by primary conversion,
σLs represents a leakage inductance,
Ls represents a primary self-inductance,
Lr represents a secondary self-inductance, $$T_r = \frac{L_r}{R_r}$$

represents a secondary time constant,
M represents a mutual inductance, and
$\hat{\omega}_r$ represents a rotator angular velocity.

Equations (1) and (2) are based on a continuous system. However, obviously, in the case of implementation, discretized equations may be used.

Next, the stator frequency computing unit 112, the torque error computing unit 113, and the speed estimator 114 will be sequentially described in detail.

The stator frequency computing unit 112 computes a stator frequency $\omega_0$ in accordance with equation (3) by using the estimated magnetic flux values ($\hat{\lambda}_\alpha$ and $\hat{\lambda}_\beta$) estimated by the motor model computing unit 109:

$$\omega_0 = \frac{\left(\hat{\lambda}_\alpha \cdot \frac{d}{dt}\hat{\lambda}_\beta - \hat{\lambda}_\beta \cdot \frac{d}{dt}\hat{\lambda}_\alpha\right)}{\hat{\lambda}_\alpha^2 + \hat{\lambda}_\beta^2} \quad (3)$$

A differential operation portion of equation (3) may be obtained by dividing a value obtained by subtracting the last magnetic flux value from the current magnetic flux value by a computation time, causing the computation result to pass through a low-pass filter, and eliminating a ripple portion generated in a sudden change.

The torque error computing unit 113 is provided to compute a difference between the estimated torque and the actual torque. However, since the actual torque cannot be directly measured, a torque error $\Delta\tau$ is computed by using the estimated magnetic flux values ($\hat{\lambda}_\alpha$ and $\hat{\lambda}_\beta$) estimated by the motor model computing unit 109 and the deviations ($\Delta i_{s\alpha}$ and $\Delta i_{s\beta}$) computed by the subtracters 110 and 111, in accordance with equation (4):

$$\Delta\tau = \hat{\lambda}_\alpha \cdot \Delta i_{s\beta} - \hat{\lambda}_\beta \cdot \Delta i_{s\alpha} \quad (4)$$

Figure 2:
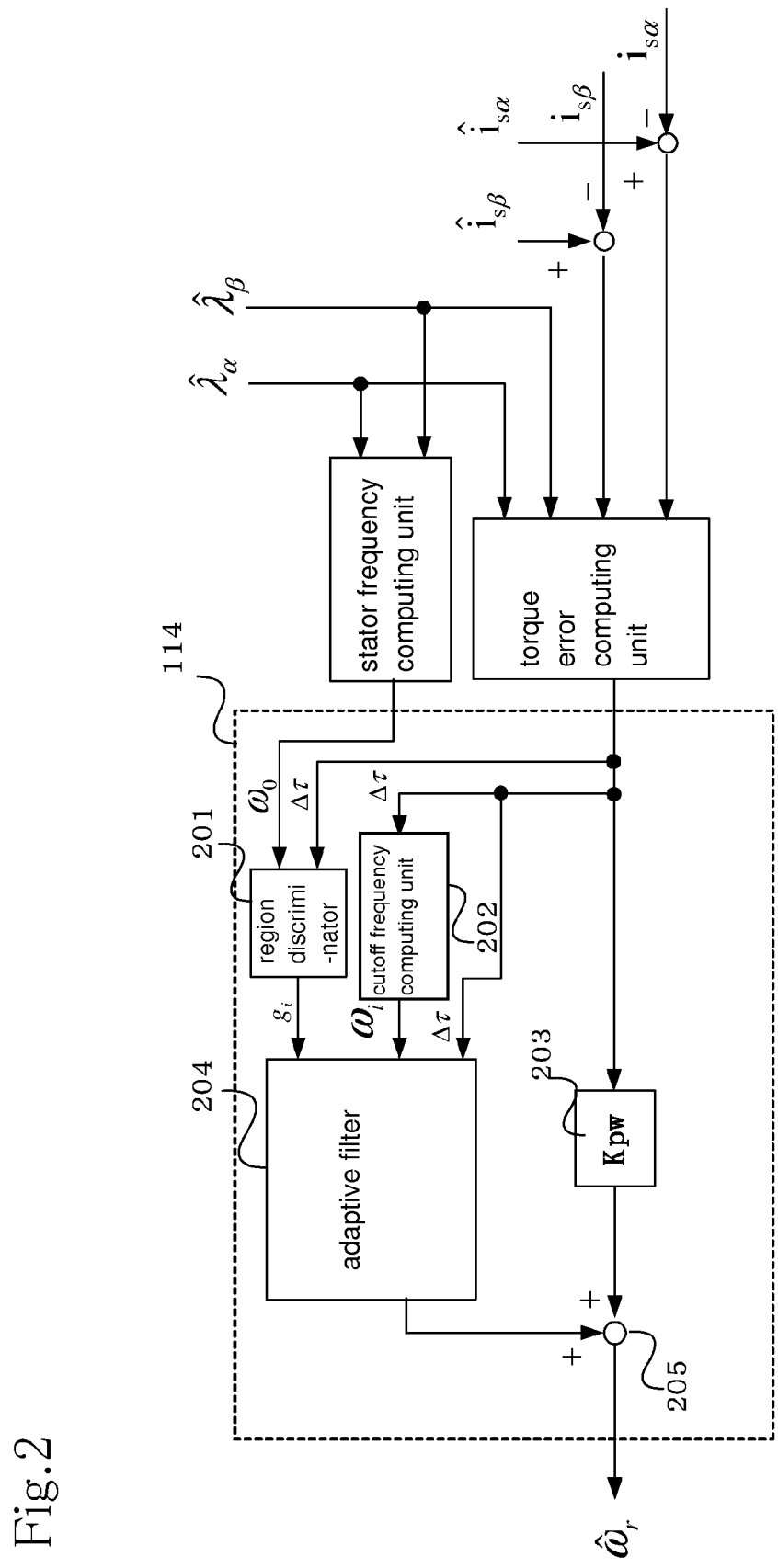
FIG. 2 is a detailed block diagram of a speed estimator according to the first embodiment.

Next, the speed estimator 114 will be explained. FIG. 2 is a detailed block diagram of the speed estimator 114. The speed estimator 114 includes a region discriminator 201, a cutoff frequency computing unit 202, a proportional controller 203, an adaptive filter 204, and an adder 205.

The region discriminator 201 is configured to perform conditional comparison of the stator frequency $\omega_0$ and the torque error $\Delta\tau$, and sets a coefficient $g_i$ to 1 or 0. More specifically, in a case where the absolute value of the stator frequency $\omega_0$ is smaller than or equal to a set value (about $\frac{1}{200}$ of the rated driving frequency) and the absolute value of the torque error $\Delta\tau$ is equal to or greater than a set value (0.5% of the rated torque), the coefficient $g_i$ is set to 1. In a case where the above conditions are not met, the coefficient $g_i$ is set to 0. That is, in a case where the torque error $\Delta\tau$ increases in a region near the zero frequency, the coefficient $g_i$ is set to 1.

The cutoff frequency computing unit 202 is configured to compute a cutoff frequency $\omega_i$ that is proportional to the torque error $\Delta\tau$. By setting the conversion factor between the torque and the frequency to $\mu$, the cutoff frequency $\omega_i$ is computed by using equation (5):

$$\omega_i = \mu \cdot |\Delta\tau| \quad (5)$$

Note that the conversion factor $\mu$ should be set to within a range of about 1 to about 10 [rad/s] when the torque error $\Delta\tau$ is equal to the rated torque of the motor 101.

The adaptive filter 204 has the coefficient $g_i$ and the cutoff frequency $\omega_i$. The adaptive filter 204 receives the torque error $\Delta\tau$, and computes a first estimated speed value $\hat{\omega}_{r1}$ in accordance with equation (6):

$$\hat{\omega}_{r1} = \frac{Kiw \cdot (1 + g_i(\omega_i - 1))}{s + g_i\omega_i} \Delta\tau \quad (6)$$

Figure 3:
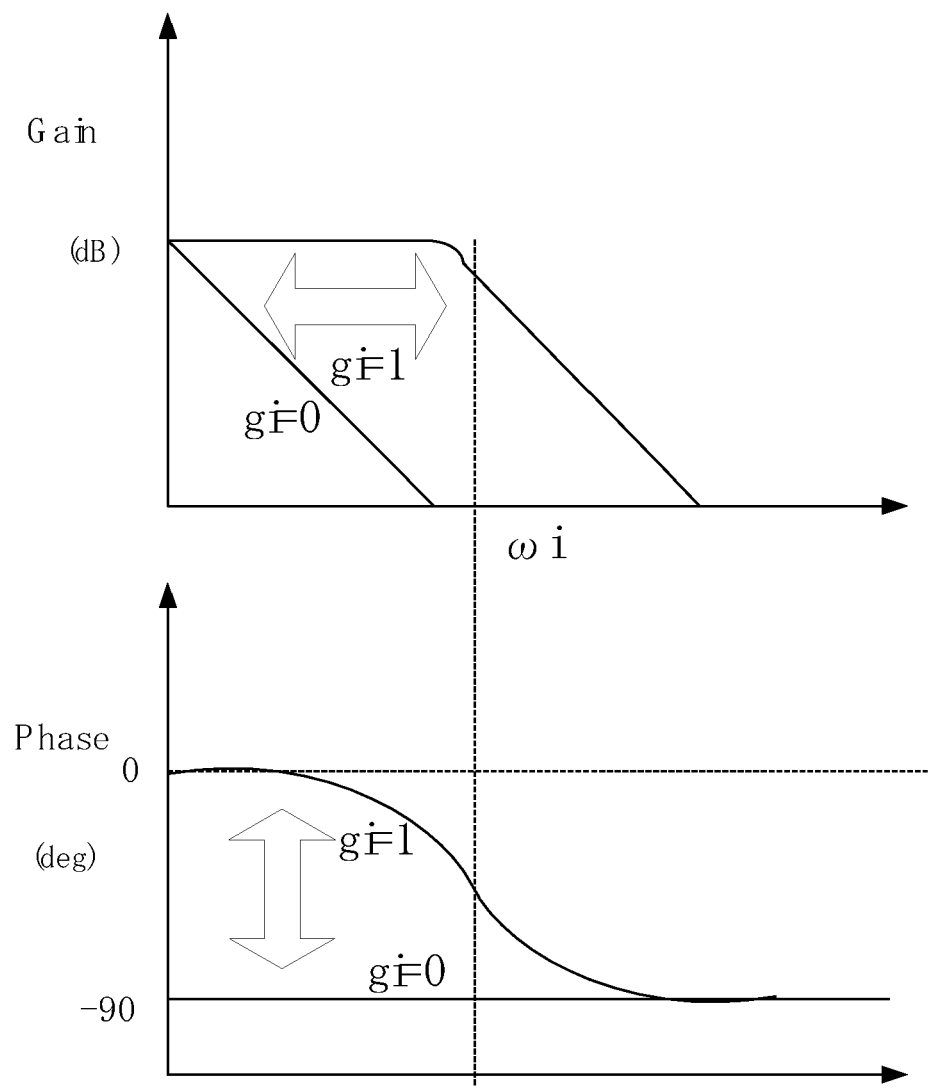
FIG. 3 includes illustrations for explaining filter characteristics of an adaptive filter according to the first embodiment.

The filter characteristic of the adaptive filter 204 is set in such a manner that the adaptive filter 204 operates as a full integrator when the coefficient $g_i$ is 0 and the filter bandwidth is increased to the cutoff frequency $\omega_i$ and the phase is changed from −90 degrees to 0 degree when the coefficient $g_i$ is 1, as shown in FIG. 3.

The proportional controller 203 multiplies the received torque error $\Delta\tau$ by a gain Kpw in accordance with equation (7) and outputs the obtained value as a second estimated speed value $\hat{\omega}_{r2}$:

$$\hat{\omega}_{r2} = Kpw \cdot \Delta\tau \quad (7)$$

The adder 205 adds the first estimated speed value $\hat{\omega}_{r1}$ to the second estimated speed value $\hat{\omega}_{r2}$, and outputs the obtained value as the final estimated speed value $\hat{\omega r}$.

As described above, the speed estimator 114 estimates the speed of the motor 101 by using the value obtained by adding the output of the proportional controller 203 configured to reduce the torque error $\Delta\tau$ to zero to the output of the adaptive filter 204 configured to eliminate a high-frequency component of the torque error $\Delta\tau$.

Figure 4A:
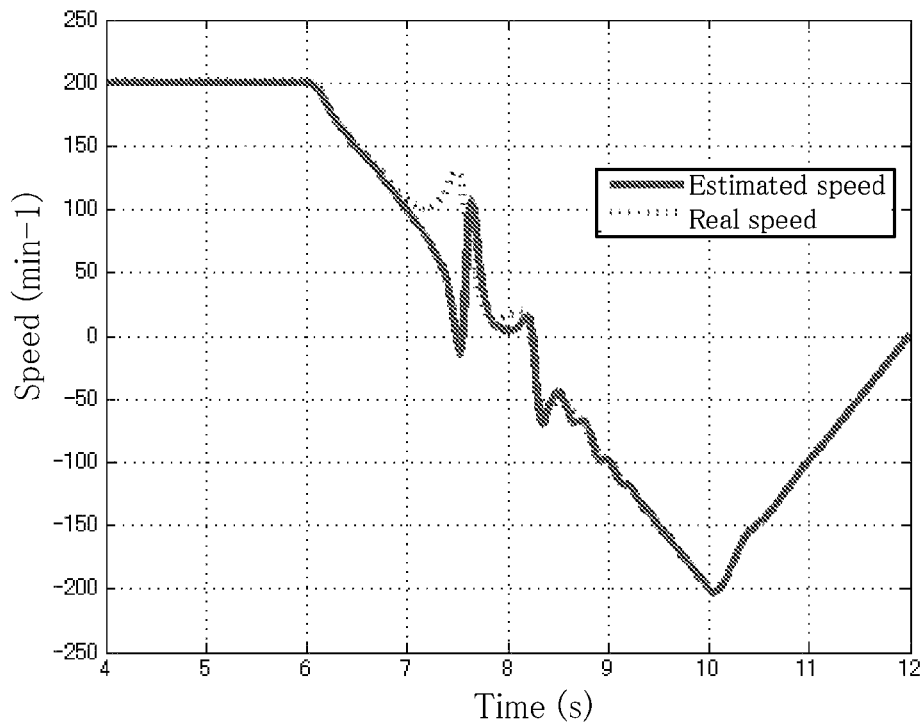
FIG. 4A includes chart diagrams showing a case where the related art is applied.
Figure 4A:
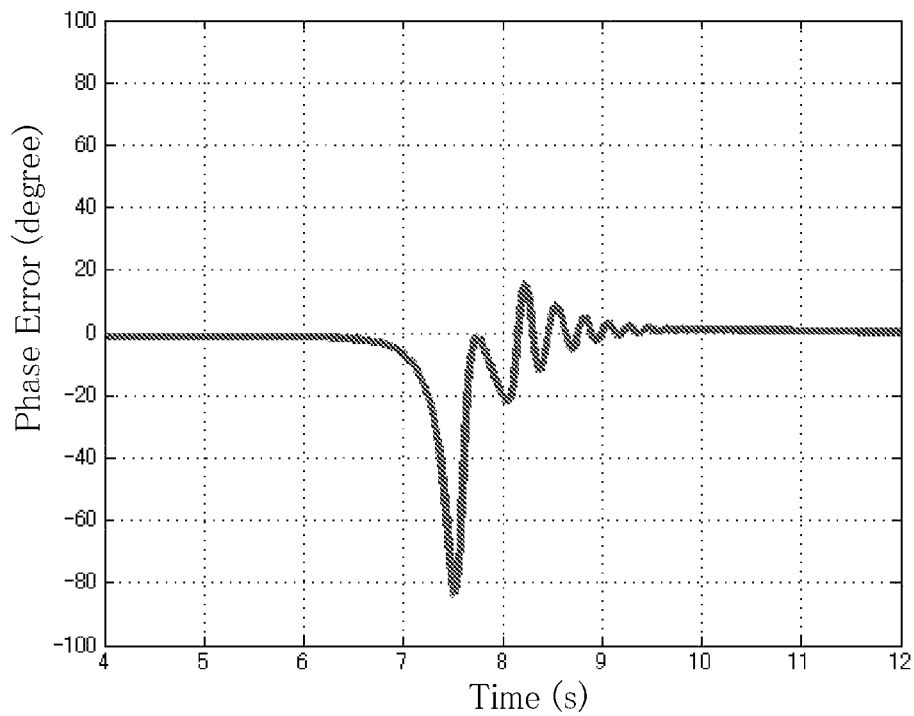
Figure 4B:
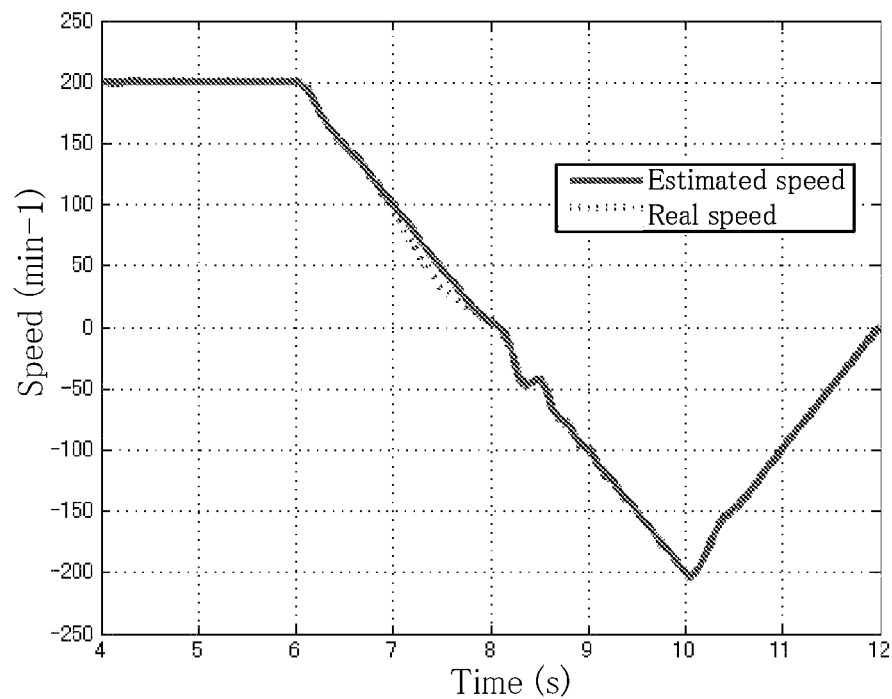
FIG. 4B includes chart diagrams showing effects achieved in a case where the first embodiment of present invention is applied.
Figure 4B:
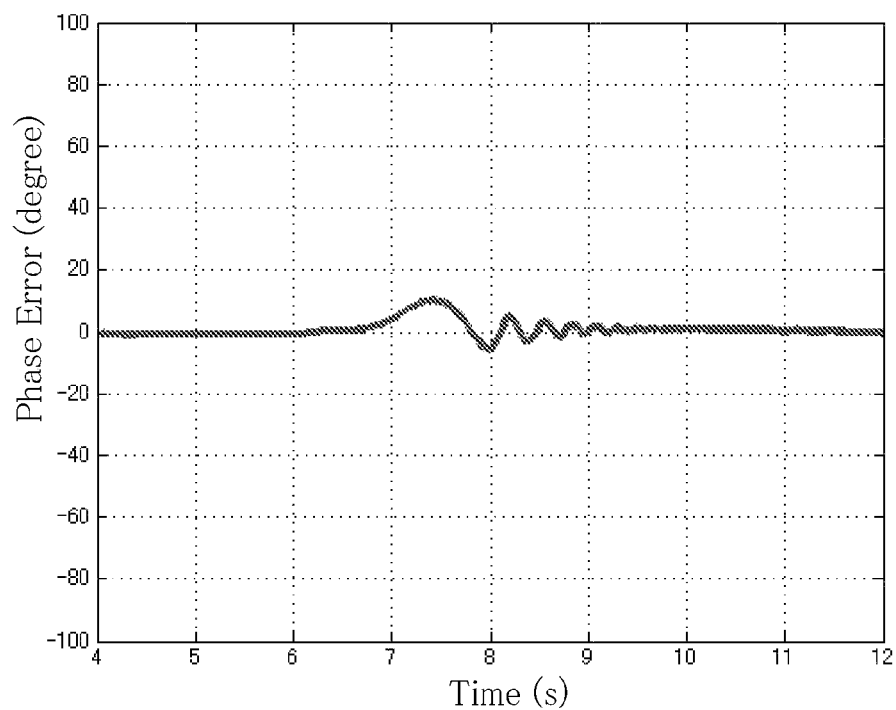

FIG. 4A includes chart diagrams showing a case where the related art is applied. FIG. 4B includes chart diagrams showing effects achieved in a case where the first embodiment of the present invention is applied. FIG. 4A shows an estimated speed error and a phase error obtained, by using a known speed estimator employing proportional-plus-integral compensation, when the motor 101 is switched from normal rotation to reverse rotation in a rated load state of the motor 101. FIG. 4B shows an estimated speed error and a phase error obtained in a case where the first embodiment of the present invention is applied under the same conditions.

In the related art, near a region in which the speed is zero, an estimated speed error increases and the phase error accordingly increases. Meanwhile, according to an aspect of the present invention, both the estimated speed error and the phase error are reduced, and in particular, the speed error and the phase error are significantly reduced near the zero frequency, thus maintaining a reliable operation.

Since an AC motor control apparatus according to the first embodiment of the present invention is configured as described above, the operations and effects described below can be achieved.

Since the position and speed of a motor can be reliably estimated even in a region in which the driving frequency of the motor is low (including zero), torque control and speed control of the motor can be performed without using a position or speed sensor. Furthermore, the cutoff frequency of a filter used when a torque error is computed can be varied, and vibrations caused by the characteristics of the motor and a machine to which the motor is connected can be handled. Therefore, control instability can be reduced.

Figure 5:
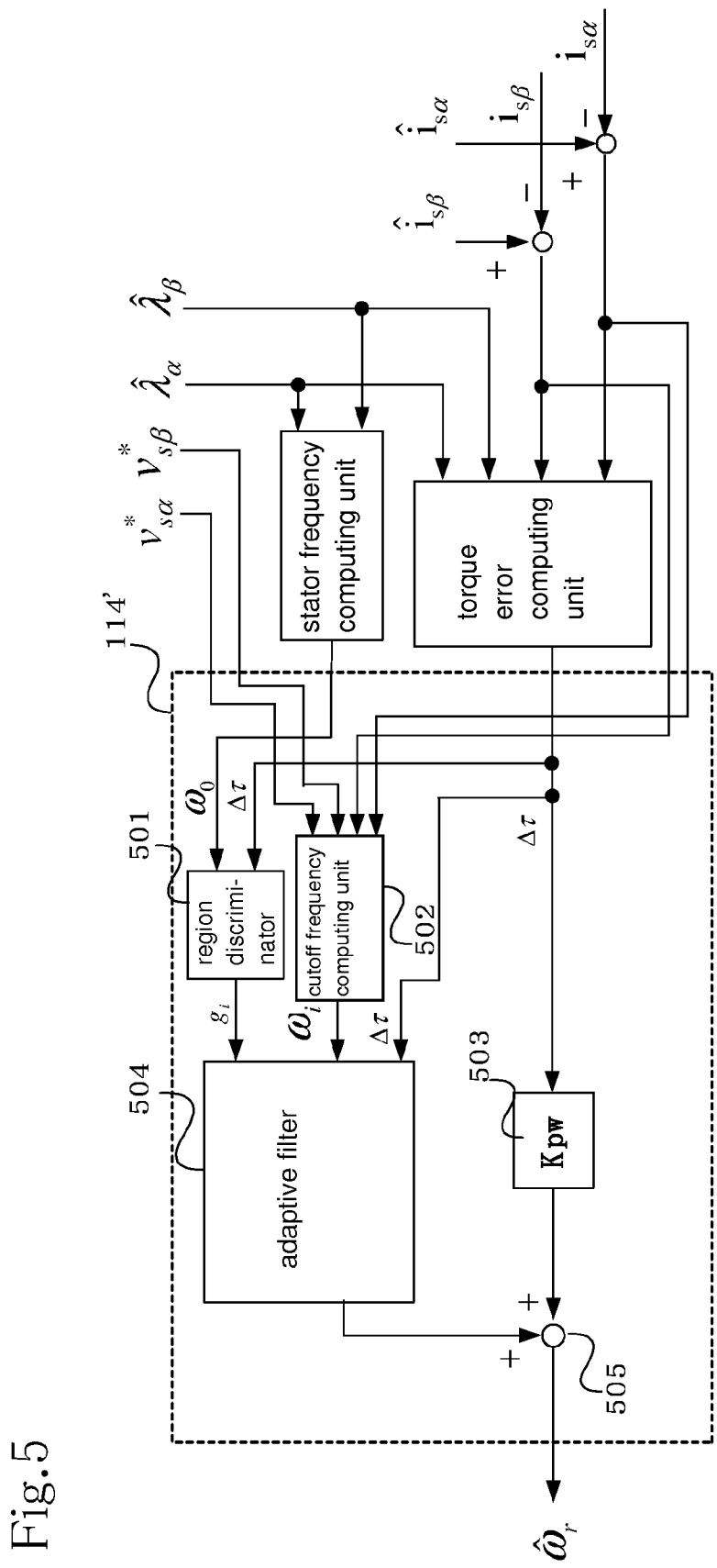
FIG. 5 is a detailed block diagram of a speed estimator according to a second embodiment.

FIG. 5 is a detailed block diagram of a speed estimator 114' according to a second embodiment of the present invention. In the first embodiment, the speed estimator 114 in which the cutoff frequency computing unit 202 computes a cutoff frequency that is proportional to a torque error is used. Meanwhile, in the second embodiment, the speed estimator 114' is used instead of the speed estimator 114. That is, additional input signals are input to the speed estimator 114', and a cutoff frequency computing unit 502 of the speed estimator 114' computes a cutoff frequency that is proportional to a reactive power error $\Delta q$. As shown in FIG. 5, the speed estimator 114' further includes a region discriminator 501, a proportional controller 503, an adaptive filter 504, and an adder 505. Operations of the region discriminator 501, the proportional controller 503, the adaptive filter 504, and the adder 505 are the same as those of the region discriminator 201, the proportional controller 203, the adaptive filter 204, and the adder 205. Hence, the explanation of the region discriminator 501, the proportional controller 503, the adaptive filter 504, and the adder 505 will be omitted.

The cutoff frequency computing unit 502 will be explained. The cutoff frequency computing unit 502 computes a reactive power error $\Delta q$ in accordance with equation (8) by using two-phase voltage commands ($V^*_{s\alpha}$ and $V^*_{s\beta}$) in the rest system of coordinates and deviations ($\Delta i_{s\alpha}$ and $\Delta i_{s\beta}$) computed by the subtracters 110 and 111, and computes a cutoff frequency $\omega_i$ in accordance with equation (9) by using a conversion factor $\mu q$ between power and frequency:

$$\Delta q = V^*_{s\alpha} \cdot \Delta i_{s\beta} - V^*_{s\beta} \cdot \Delta i_{s\alpha} \quad (8)$$

$$\omega_i = \mu_q \cdot |\Delta q| \quad (9)$$

Note that the conversion factor $\mu q$ should be set to within a range of about 1 to about 10 [rad/s] when the reactive power error $\Delta q$ is equal to the rated output of the motor 101.

Since, as with a torque error $\Delta\tau$, the reactive power error $\Delta q$ is caused by a speed estimation error, the adaptive filter 504 is capable of obtaining a first estimated speed value $\hat{\omega}_{r1}'$ in accordance with an operation similar to that of the adaptive filter 204 shown in FIG. 2.

As described above, the speed estimator 114' estimates the speed of the motor 101 by using the value obtained by adding an output of the proportional controller 503 that is configured to reduce the torque error $\Delta\tau$ to zero to an output of the adaptive filter 504 that eliminates a high-frequency component of the reactive power error $\Delta q$.

Since the speed estimator 114' is configured as described above in the second embodiment of the present invention, the operations and effects described below can be achieved.

Since the position and speed of a motor can be reliably estimated even in a region in which the driving frequency of the motor is low (including zero), torque control and speed control of the motor can be performed without using a position or speed sensor. Furthermore, the cutoff frequency of a filter used when a reactive power error is computed can be varied, and vibrations caused by the characteristics of the motor and a machine to which the motor is connected can be handled. Therefore, control instability can be reduced.

Figure 6:
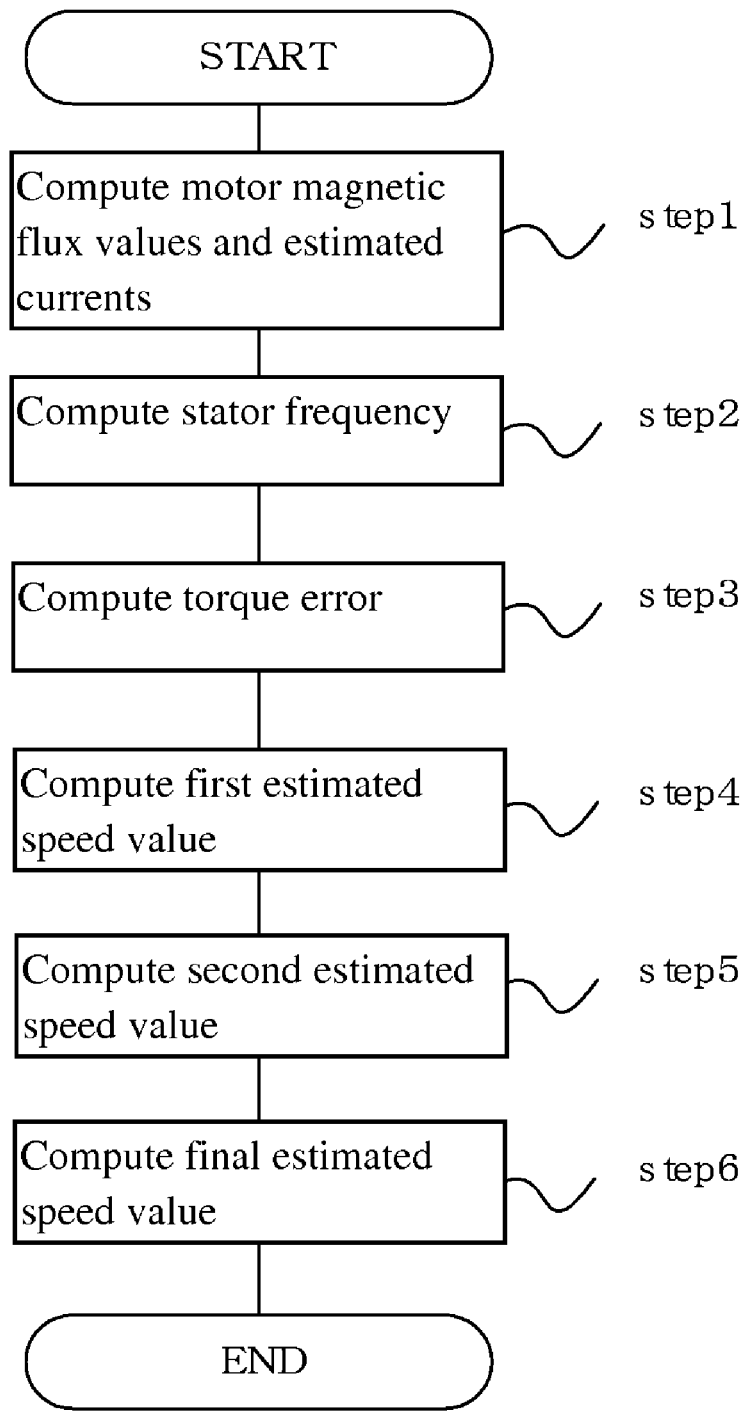
FIG. 6 is a flowchart showing a control method performed in an AC motor control apparatus according to a third embodiment.

FIG. 6 is a flowchart showing a control method performed in an AC motor control apparatus according to a third embodiment of the present invention. A speed estimation method according to the third embodiment will be explained with reference to the flowchart of FIG. 6.

In step 1, motor magnetic flux values ($\hat{\lambda}_\alpha$ and $\hat{\lambda}_\beta$) and estimated currents ($\hat{i}_{s\alpha}$ and $\hat{i}_{s\beta}$) are computed by using voltage commands ($V^*_{sd}$ and $V^*_{sq}$) output from the vector controller 107 to the motor 101 and a magnetic flux azimuth $\hat{\theta}$. This processing has been described above in the explanation of the motor model computing unit 109 in the first embodiment.

In step 2, a stator frequency $\omega_0$ of the motor magnetic flux values ($\hat{\lambda}_\alpha$ and $\hat{\lambda}_\beta$) computed in step 1 is computed. This processing has been described above in the explanation of the stator frequency computing unit 112 in the first embodiment.

In step 3, a torque error $\Delta\tau$ is computed by using the motor magnetic flux values ($\hat{\lambda}_\alpha$ and $\hat{\lambda}_\beta$) and the estimated currents ($\hat{i}_{s\alpha}$ and $\hat{i}_{s\beta}$) computed in step 1 and motor currents ($i_{s\alpha}$ and $i_{s\beta}$) detected by using the current detector 102 and obtained by performing coordinate conversion. This processing has been described above in the explanation of the subtracters 110 and 111 and the torque error computing unit 113 in the first embodiment.

In step 4, a first estimated speed value $\hat{\omega}_{r1}$ is computed by multiplying the torque error $\Delta\tau$ computed in step 3 by a proportional gain Kpw. This processing has been described above in the explanation of the proportional controller 203 in the first embodiment.

In step 5, a second estimated speed value $\hat{\omega}_{r2}$ is computed by eliminating a high-frequency component of the torque error $\Delta\tau$ by using the stator frequency $\omega_0$ computed in step 2 and a cutoff frequency $\omega_i$ determined in accordance with the torque error $\Delta\tau$ computed in step 3. This processing has been described above in the explanation of the adaptive filter 204 in the first embodiment.

In step 6, an estimated speed value $\hat{\omega}_r$ is computed by adding the first estimated speed value $\hat{\omega}_{r1}$ computed in step 4 to the second estimated speed value $\hat{\omega}_{r2}$ computed in step 5. The estimated speed value $\hat{\omega}_r$ is used for vector control and speed control performed in the vector controller 107 and the like in the first embodiment.

In the processing of step 5, as described in the second embodiment, a high-frequency component of the torque error $\Delta\tau$ may be eliminated by computing a reactive power error $\Delta q$ by using voltage commands ($V^*_{sd}$ and $V^*_{sq}$), estimated currents ($\hat{i}_{s\alpha}$ and $\hat{i}_{s\beta}$), and motor currents ($i_{s\alpha}$ and $i_{s\beta}$), and determining a cutoff frequency $\omega_i$ in accordance with the reactive power error $\Delta q$.

Since the control method performed in an AC motor control apparatus according to the third embodiment of the present invention is implemented, operations and effects similar to those of the first and second embodiments can be achieved.

According to the foregoing embodiments, the position and speed of a motor can be reliably estimated and torque control and speed control can be performed even in a region in which the driving frequency of the motor is low (including zero) by improving a speed estimator itself, without performing input correction of a motor model, unlike in the related art. Therefore, the present invention can be applied to general industrial machinery, in particular, to uses under circumstances in which a speed sensor cannot be used due to high temperature or high vibration.

What is claimed is:

1. An alternating-current motor control apparatus including a pulse width modulation controller for driving an alternating-current motor by outputting a command voltage, comprising:
   a motor model computing unit configured to compute a motor magnetic flux and an estimated current of the alternating-current motor by using the command voltage;
   a current detector configured to detect a motor current flowing in the alternating-current motor;
   a stator frequency computing unit configured to compute a stator frequency of the motor magnetic flux;
   a torque error computing unit configured to compute a torque error by using the motor magnetic flux, the estimated current, and the motor current; and
   a speed estimator configured to estimate a speed of the alternating-current motor by using the stator frequency and the torque error, the speed estimator comprising:
      an adaptive filter configured to adapt a filter characteristic based on the torque error and configured to compute a first estimated speed value by eliminating a high-frequency component of the torque error;
      a proportional controller configured to compute a second estimated speed value based on the torque error to reduce a torque error computed by the torque error computing unit to zero; and
      an adder configured to compute a third estimated speed value by adding the first estimated speed value to the second estimated speed value.

2. The alternating-current motor control apparatus according to claim 1, wherein the adaptive filter has a coefficient determined in accordance with a cutoff frequency associated with the torque error, the torque error, and the stator frequency.

3. The alternating-current motor control apparatus according to claim 2, wherein the cutoff frequency is proportional to the torque error.

4. An alternating-current motor control apparatus including a pulse width modulation controller for driving an alternating-current motor by outputting a command voltage, comprising:
   a motor model computing unit configured to compute a motor magnetic flux and an estimated current of the alternating-current motor by using the command voltage;
   a current detector configured to detect a motor current flowing in the alternating-current motor.

a stator frequency computing unit configured to compute a stator frequency of the motor magnetic flux;

a torque error computing unit configured to compute a torque error by using the motor magnetic flux, the estimated current, and the motor current; and a speed estimator configured to estimate a speed of the alternating-current motor by using the stator frequency and the torque error, wherein the speed estimator estimates the speed of the alternating-current motor by using a value obtained by adding an output of a proportional controller configured to reduce the torque error to zero to an output of an adaptive filter configured to eliminate a high-frequency component of the torque error, and wherein a cutoff frequency is computed in accordance with a reactive power error computed by using the command voltage, the estimated current, and the motor current, and the adaptive filter has a coefficient determined in accordance with the cutoff frequency, the torque error, and the stator frequency.

5. The alternating-current motor control apparatus according to claim 4, wherein the cutoff frequency is proportional to the reactive power error.

6. An alternating-current motor control apparatus including a pulse width modulation controller for driving an alternating-current motor by outputting a command voltage, comprising:

a motor model computing unit configured to compute a motor magnetic flux and an estimated current of the alternating-current motor by using the command voltage;

a current detector configured to detect a motor current flowing in the alternating-current motor;

a stator frequency computing unit configured to compute a stator frequency of the motor magnetic flux;

a torque error computing unit configured to compute a torque error by using the motor magnetic flux, the estimated current, and the motor current; and a speed estimator configured to estimate a speed of the alternating-current motor by using the stator frequency and the torque error, wherein the speed estimator estimates the speed of the alternating-current motor by using a value obtained by adding an output of a proportional controller configured to reduce the torque error to zero to an output of an adaptive filter configured to eliminate a high-frequency component of the torque error, wherein the adaptive filter has a coefficient determined in accordance with a cutoff frequency associated with the torque error, the torque error, and the stator frequency, and wherein the adaptive filter operates as an integrator when the coefficient is 0, and operates as a primary delay filter when the coefficient is 1.

7. The alternating-current motor control apparatus according to claim 4, wherein the adaptive filter operates as an integrator when the coefficient is 0, and operates as a primary delay filter when the coefficient is 1.

8. An alternating-current motor control apparatus including a pulse width modulation controller for driving an alternating-current motor by outputting a command voltage, comprising:

means for computing a motor magnetic flux and an estimated current of the alternating-current motor by using the command voltage;

means for detecting a motor current flowing in the alternating-current motor;

means for computing a stator frequency of the motor magnetic flux;

means for computing a torque error by using the motor magnetic flux, the estimated current, and the motor current; and means for estimating a speed of the alternating-current motor by using the stator frequency and the torque error, the means for estimating a speed of the alternating-current motor comprising:

means for adapting a filter characteristic based on the torque error and computing a first estimated speed value by eliminating a high-frequency component of the torque error;

means for computing a second estimated speed value based on the torque error to reduce a torque error computed by the torque error computing unit to zero; and means for computing a third estimated speed value by adding the first estimated speed value to the second estimated speed value.

9. The alternating-current motor control apparatus according to claim 8, wherein the means for adapting the filter characteristic has a coefficient determined in accordance with a cutoff frequency associated with the torque error, the torque error, and the stator frequency.

10. The alternating-current motor control apparatus according to claim 9, wherein the cutoff frequency is proportional to the torque error.

11. The alternating-current motor control apparatus according to claim 8, wherein a cutoff frequency is computed in accordance with a reactive power error computed by using the command voltage, the estimated current, and the motor current, and the means for adapting the filter characteristic has a coefficient determined in accordance with the cutoff frequency, the torque error, and the stator frequency.

12. The alternating-current motor control apparatus according to claim 11, wherein the cutoff frequency is proportional to the reactive power error.

13. The alternating-current motor control apparatus according to claim 9, wherein the means for adapting the filter characteristic operates as an integrator when the coefficient is 0, and operates as a primary delay filter when the coefficient is 1.

14. The alternating-current motor control apparatus according to claim 11, wherein the means for adapting the filter characteristic operates as an integrator when the coefficient is 0, and operates as a primary delay filter when the coefficient is 1.

* * * * *